United States Patent [19]

Logothetis et al.

[11] Patent Number: 5,229,345
[45] Date of Patent: Jul. 20, 1993

[54] METHOD OF MAKING A CATALYTIC METAL OXIDE SELECTIVE FOR THE CONVERSION OF A GAS AND A COATING SYSTEM FOR THE SELECTIVE OXIDATION OF HYDROCARBONS AND CARBON MONOXIDE

[75] Inventors: Eleftherios M. Logothetis, Birmingham; Richard E. Soltis, Redford, both of Mich.

[73] Assignee: Ford Motor Company, Dearborn, Mich.

[21] Appl. No.: 878,247

[22] Filed: May 4, 1992

[51] Int. Cl.$^5$ .................. B01J 21/06; B01J 23/02; B01J 23/14; B01J 23/74

[52] U.S. Cl. .................. 502/242; 502/200; 502/325; 502/326; 502/334; 502/337; 502/338; 502/339; 502/340; 502/344; 502/349; 502/350

[58] Field of Search ............... 502/200, 334, 339, 242, 502/325, 326, 337, 340, 344, 349, 350, 338; 423/213.5

[56] References Cited

U.S. PATENT DOCUMENTS

| | | | |
|---|---|---|---|
| 4,478,797 | 10/1984 | Diwell et al. | 423/213.5 |
| 4,650,782 | 3/1987 | Onal | 502/339 |
| 5,021,388 | 6/1991 | Fridez et al. | 502/200 X |
| 5,102,853 | 4/1992 | Chattha et al. | 502/339 X |

FOREIGN PATENT DOCUMENTS

| | | | |
|---|---|---|---|
| 53-76189 | 7/1978 | Japan | 502/339 |
| 1052105 | 12/1966 | United Kingdom | 502/339 |

*Primary Examiner*—W. J. Shine
*Attorney, Agent, or Firm*—Joseph W. Malleck; Roger L. May

[57] ABSTRACT

Method of making a catalytic metal oxide selective to catalyzing the conversion of given gas species, comprising intimately supporting a solid film of catalytic metal oxide (i.e., $TiO_2$, $SnO_2$, FeO, $SrTiO_3$, CoO) on an electrically conducting material (i.e., Au, Pt, TiN, Pd, Rh, Ni, Co), the film having an exposed outer surface spaced no greater than 1000 angstroms from said conducting material, the composition of the conducting material being matched to the composition of the oxide to change the electron state of the exposed outer surface to promote only a reaction between given gas species and said oxide.

A composite metal oxide catalyst system, comprising: a substantially nonconducting support; an electrically conducting film on the support; and a catalytically active ultra-thin outer layer of a catalytic metal oxide on and in intimate contact with the conducting film.

7 Claims, 2 Drawing Sheets

METHOD OF MAKING A CATALYTIC METAL OXIDE SELECTIVE FOR THE CONVERSION OF A GAS AND A COATING SYSTEM FOR THE SELECTIVE OXIDATION OF HYDROCARBONS AND CARBON MONOXIDE

BACKGROUND OF THE INVENTION

1. Technical Field

This invention relates to the technology of influencing the catalytic activity of metal oxides useful in gas sensors and/or catalytic converters, and more particularly to the technology for increasing or decreasing catalytic activity of $TiO_2$ for oxidation of oxidizable molecules such as carbon monoxide and hydrocarbons.

2. Discussion of the Prior Art

Metal oxides, such as $TiO_2$, have been used as materials for gas sensors and catalysts when promoting oxidation of gas molecules such as CO, $H_2$, and HC. Such metal oxides are not selective as catalysts or as chemical sensor materials, that is, they catalyze or sense much more than one chemical at the same time. It would be desirable to achieve some degree of selectivity by such metal oxides without contaminating the material and/or reducing its effectiveness.

U.S. patents disclosing use of $TiO_2$ in automotive catalyst systems have restricted its function to a barrier or stabilizer coating over other elements, which may be conductive, the latter acting as the catalyst.

U.S. Pat. No. 4,650,782 suggests that titania may be used as a thick protective outer layer over a catalytically effective amount of a noble metal (i.e., platinum) which in turn is supported by alumina. All layers, including the titania and alumina, are coatings achieved by dipping in a slurry. The resulting $TiO_2$ coating is 0.003–0.01 inches thick, preventing its use as a modifier of catalyst selectivity. The titania is not used as an active catalyst, but rather as a barrier to lead poisoning in the presence of $SO_2$. Such reference does not teach how to activate titania as an oxidizing catalyst, particularly for use as an electrode in gas sensors.

U.S. Pat. No. 4,478,797 is another automotive exhaust gas converter disclosure which deposits a mixture of catalytically active amounts of platinum and titania over a metallic substrate, but is separated by an intervening insulating washcoat layer of alumina. Data in such patent shows that there is no difference in the efficiency between catalysts with or without titania for conversion of $CH_4$ and $C_2H_4$ (see FIG. 3). Accordingly, this reference does not teach how to activate titania as an oxidizing catalyst nor make $TiO_2$ more selective to certain gases.

SUMMARY OF THE INVENTION

The invention teaches how to change the ability of titania to act as an effective oxidation catalyst by using an intimate, electrically conducting underlayer that modifies the behavior of titania, provided the outer surface of the titania exposed to the gas to be treated is closely positioned adjacent the conducting underlayer.

In a first aspect, the invention is a method of making a catalytic metal oxide selective to catalyzing the conversion of given gas species, comprising: intimately supporting a solid film of catalytic metal oxide (e.g., $TiO_2$, ZnO, $SnO_2$, FeO, $SrTiO_2$, CoO) on an electrically conducting material (e.g., Au, Pt, TiN, Pd, Rh, Ni, Co), the exposed outer surface of said film being no greater than 1000 angstroms from said conducting material, the composition of said conducting material being matched to the composition of said oxide to change the electron state of the exposed outer surface to promote only a reaction between given gas species and said oxide.

In a second aspect, the invention is a method of modifying the gas/solid interaction process of a catalytic metal oxide: (a) forming a composite by supporting a layer of catalytic metal oxide directly on an electrically conducting material with the metal oxide presenting an exposed outer surface (the metal oxide being selected from the group consisting of $TiO_2$, FeO, ZnO, CoO, $SrTiO_3$, and $SnO_2$); (b) controlling the distance between said exposed outer surface and conducting material to be in the range of 50–1000 angstroms; and (c) exposing the composite to at least one of gaseous hydrocarbons and CO for oxidation conversion.

The composite is supported on a material of alumina or quartz. The thickness of the metal oxide is less than 0.000004 inches (1000 angstroms), which is at least about eight times thinner than any of the prior art coatings suggested. Such thickness may be advantageously achieved by direct sputtering. The electrically conducting material may be in a thickness range of 0.1–1.0 microns.

Another aspect of the invention is a composite metal oxide catalyst system comprising, with or without a base support of nonconductive material, an electrically conducting material and an ultra-thin outer coating of a catalytic metal oxide material in intimate contact with the conducting material.

DETAILED DESCRIPTION AND BEST MODE

The invention, in a first aspect, is a method for changing the catalytic properties of a base metal oxide such as titania for the oxidation of oxidizable molecules such as CO, $H_2$, and various hydrocarbons. The modified metal oxide can then be used more advantageously in most applications employing the catalytic properties of the oxide. As an example, consider $SnO_2$ for gas sensing applications. It is known that the electrical resistance of $SnO_2$, either in the form of a ceramic or film, depends on the concentration of oxidizable (reducing) molecules in the surrounding air. Simple chemical sensors are constructed to use this property, which can detect and measure the concentration of such molecules in air. Unfortunately, these sensors are not specific, that is, they respond with different sensitivities to more than one species. Attempts to modify selectivity by doping or mixing with other elements or changing its oxygen content or changing operating temperature to change the selectivity, but at a cost of overall reduced effectiveness. If an array of sensing elements from different oxides or from the same oxide is made, but modified differently, each sensing element in the array will respond differently to a mixture of gases but at the cost of complexity. Differentiation between a small number of chemicals is obtained only by measuring and analyzing the signals from the various elements of the sensor array. Moreover, it is generally difficult to modify metal oxides, such as $SnO_x$, to make them sensitive to an oxidizing species, such as $NO_x$, because of the high sensitivity of this material to reducing species.

Figure 1:
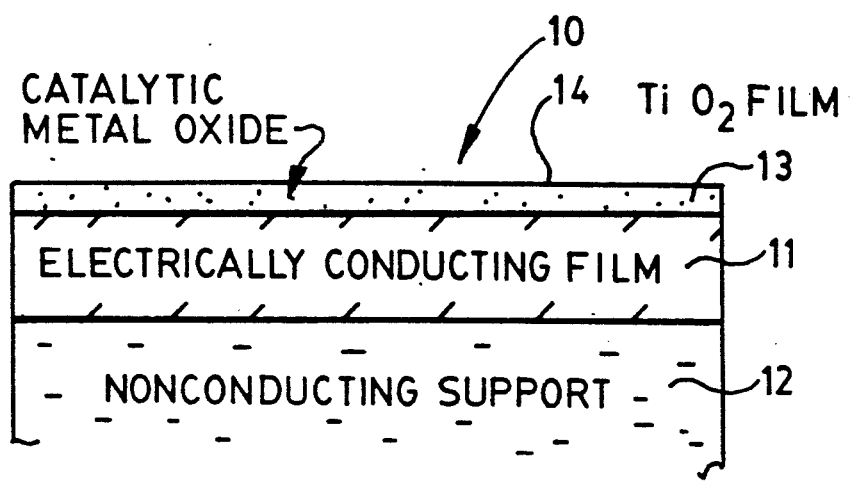
FIG. 1 is a diagrammatic illustration of the layers of the catalyst system of this invention.

FIG. 1 shows an example of a modified base metal oxidation catalyst according to the present invention. This catalyst system 10 comprises a thin electrically conducting film 11 deposited on an insulating substrate 12, and a very thin metal oxide film 13 deposited on the conducting film 11. Through its proximity, the electrically conducting layer 11 modifies the gas/solid interaction characteristics of the free surface 14 of the metal oxide.

The catalytic metal oxide is preferably $TiO_2$ but can be selected from the candidate group consisting of $TiO_2$, ZnO, $SnO_2$, FeO, $SrTiO_3$, and CoO. The conducting material can be selected from the candidate group of Au, TiN, Pt, Pd, Rh, Ni, and Co. Other metal oxide and conducting materials may be useful to perform the function of changing the electron state of the exposed outer surface of the metal oxide and thereby make the oxide more selective to conversion of a group of gases or a specific gas.

The samples used to corroborate the effectiveness of this invention were prepared as film structures by vapor deposition techniques. The electrical conducting material was first deposited as a film on an inert electrically nonconducting substrate such as alumina or quartz by sputtering. The details of the deposition depended on the specific conducting material. For example, Pt or Au films were deposited from a Pt or a Au target in an RF diode sputtering system using argon as the sputtering gas. TiN films were deposited by reactive sputtering from a Ti target in a $N_2$/Ar atmosphere. The $TiO_2$ film was deposited on top of the conducting film by RF sputtering from a $TiO_2$ target in a $O_2$/Ar mixture.

The ability of the present invention to modify the catalytic oxidation properties of a metal oxide with a conducting underlayer will be demonstrated through a series of examples.

EXAMPLE 1

As a first example, the effect of Au as a conducting underlayer to $TiO_2$ is discussed. Four different types of samples were studied. One sample type was a bare substrate, one of alumina, and one a quartz plate. The second type was an alumina or quartz plate having a Au film deposited on one side of the plate. The gold film was deposited by radio frequency sputtering from a gold target using Ar as the sputtering gas. The conditions of sputtering were within the range commonly encountered in sputtering of metals like Au. A typical set of conditions was an Ar pressure of 10.2 millitorrs and an RF power of 100 watts for a 3" diameter Au target. The thickness of the Au film, in the range 0.1–1 micron, did not seem to have any appreciable effect on the results obtained in this invention; thus, a thickness of as much as 1 mm or more can be used. The third and fourth types of samples consisted of alumina or quartz substrates with or without a gold overlayer having a $TiO_2$ film deposited on one side of the substrates (on top of the gold layer for those samples with the gold). The $TiO_2$ film was deposited by RF sputtering from an 8" $TiO_2$ target using a mixture of oxygen and argon as a sputtering gas. It was found that the best results were obtained when the $TiO_2$ films were sputter deposited in high oxygen concentrations, about 20% $O_2$ in Ar but >10% and less than 30%. Typical gas pressure was 10.2 millitorrs, the RF power was about 100 watts, and the deposition rate was about 10 A per minute. The thickness of the $TiO_2$ films in these samples was about 100 A.

The catalytic properties of the above samples (all having the same area of about 1 $cm^2$) for the oxidation of various gases were studied by successively placing each of the samples in a heated quartz tube and sending through the tube a continuous flow of a gas mixture consisting of $N_2$, $O_2$, and the oxidizable molecule under study at a total pressure of 1 atmosphere. Carbon monoxide (CO) and propane ($C_3H_8$) were used as representative oxidizable gases. The conversion efficiencies of a given sample for CO and $C_3H_8$ at various temperatures were determined from the measurement of the concentrations of the various gases before and after the sample using a mass spectrometer. Some of the results for CO and propane for a gas flow of about 100 sccm are shown in Table I. It is pointed out that the numbers given in Table I represent only relative values for the catalytic activities of the various samples. It is clear from these results that, in the temperature range 300°–500° C., bare quartz and gold films (on quartz) have zero conversion efficiencies for the oxidation of CO and propane. In contrast, $TiO_2$ films on quartz have some small catalytic activity for the oxidation of these two molecules which, as expected, increases as the temperature increases. When a gold underlayer is used, the conversion efficiency of the $TiO_2$ films decreases for both CO and propane at all temperatures.

EXAMPLE 2

The second example describes the results obtained with a TiN conducting underlayer; stoichiometric TiN has metallic conductivity and is a hard material and relatively inert. TiN may be prepared in a film form by several techniques, including chemical vapor deposition and sputtering. In the case of sputtering, TiN may be formed by reactively sputtering Ti from a Ti target in a nitrogen/argon atmosphere. The sputtering conditions (e.g., power, gas pressure, substrate temperature) necessary for obtaining conducting stoichiometric TiN films are well established in the literature. In this example, TiN films were deposited on quartz and alumina plates by reactive sputtering following the teaching of the prior art. Typical conditions were a $N_2$/Ar sputtering gas containing 20% $N_2$, a gas pressure of 1.6 millitorr, and a DC voltage of 400 volts. Subsequently, very thin $TiO_2$ films of the order of 100 A were deposited on top of some TiN layers as well as on some bare alumina and quartz plates following the same procedures and conditions used in Example 1.

The catalytic oxidation properties of the following four (different) types of samples were studied: bare quartz, TiN/quartz, $TiO_2$/quartz, and $TiO_2$/TiN/quartz. The dimensions of all films were 1 cm×1 cm. The experimental conditions and the measurements were the same as in Example 1 described above. Table II shows results obtained for the oxidation of CO and $C_3H_8$ for a number of temperatures. Again, the numbers in this Table represent relative values for the catalytic activity of the various samples. It is clear that the catalytic activity of TiN films (on quartz) for the oxidation of CO and $C_3H_8$ is essentially zero for the temperatures studied (300°–500° C.). Comparison of the results for samples with $TiO_2$ films with and without TiN underlayer clearly shows that the presence of the TiN underlayer increases greatly the catalytic activity of $TiO_2$ for both CO and $C_3H_8$ at all temperatures in the range 300°–500° C. Similar results were obtained with alumina substrates.

EXAMPLE 3

In this example, the effect of a Pt underlayer on the catalytic oxidation properties of $TiO_2$ was investigated. One complication in the case of Pt arises from the fact that Pt is one of the best known catalytic materials for the oxidation of CO and propane. In order to minimize the direct oxidation of CO and propane by Pt, the $TiO_2$ films on Pt were made essentially 1000 A. For such thicknesses, the $TiO_2$ films were virtually pinhole-free and the area of exposed Pt was thus negligible. The Pt films were deposited in the same sputtering system using Ar as the sputtering gas. The sputtering conditions were very similar to those used for the preparation of Au films. The $TiO_2$ films were prepared as in examples 1 and 2 above.

The catalytic oxidation properties of the following four types of samples were stud:,ed following the same procedures as in examples 1 and 2: bare quartz, Pt/quartz, $TiO_2$/quartz, and $TiO_2$/Pt/quartz. Again, the area of the films in all samples was about 1 cm². Table III shows the relative catalytic efficiency of the samples for propane in the temperature range 350°–500° C. The sample with the bare Pt film has the highest efficiency. However, the presence of Pt underneath the $TiO_2$ film increases substantially the efficiency of $TiO_2$, especially at the lower temperatures.

EXAMPLE 4

Figure 2:
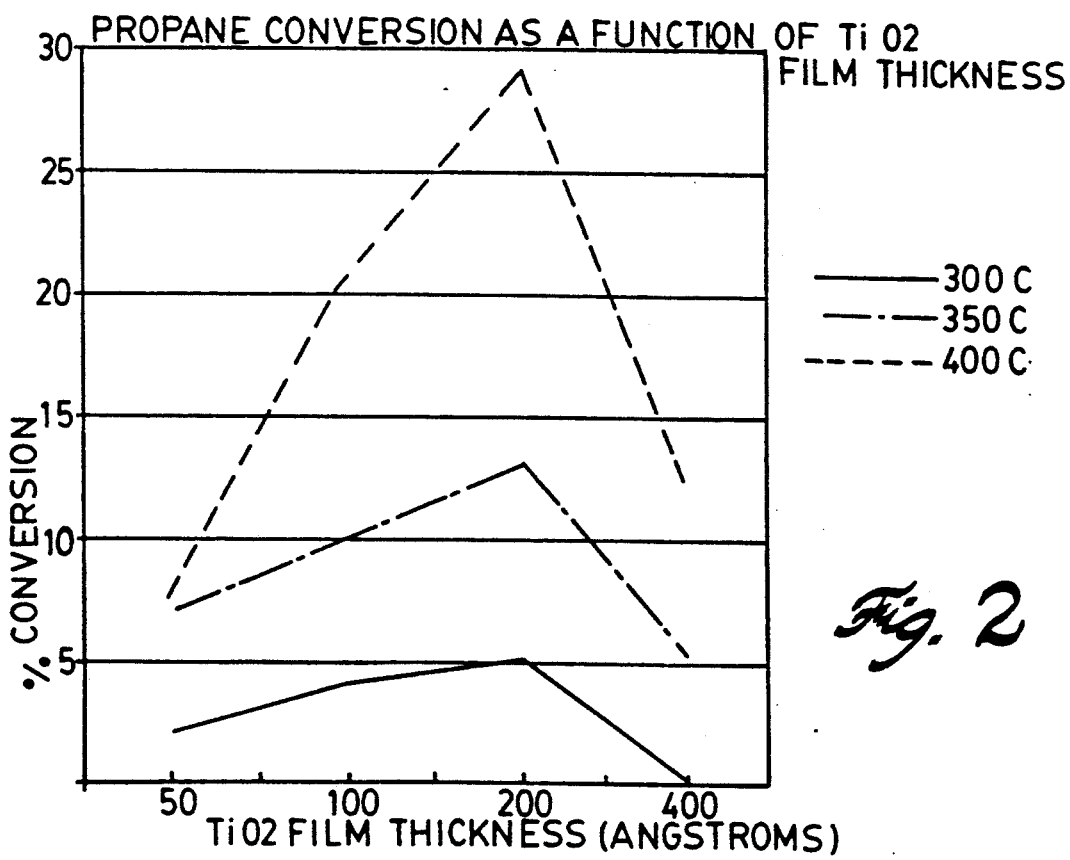
FIG. 2 is a plot of propane conversion efficiency as a function of the thickness (in angstroms) of a titania film on TiN/quartz substrate at different operating temperatures.

In this example, the catalytic efficiency for propane oxidation of $TiO_2$/TiN/quartz samples as a function of the thickness of the $TiO_2$ film was studied. Several samples with $TiO_2$ thickness in the range 50–500 A were prepared and studied following the same procedures as in the previous examples. FIG. 2 shows results obtained for these samples at three different temperatures. The enhancement in the catalytic activity of $TiO_2$ for propane oxidation as a result of the TiN underlayer depends strongly on the thickness of the $TiO_2$ film with the optimum thickness being about 200 A.

Figure 3:
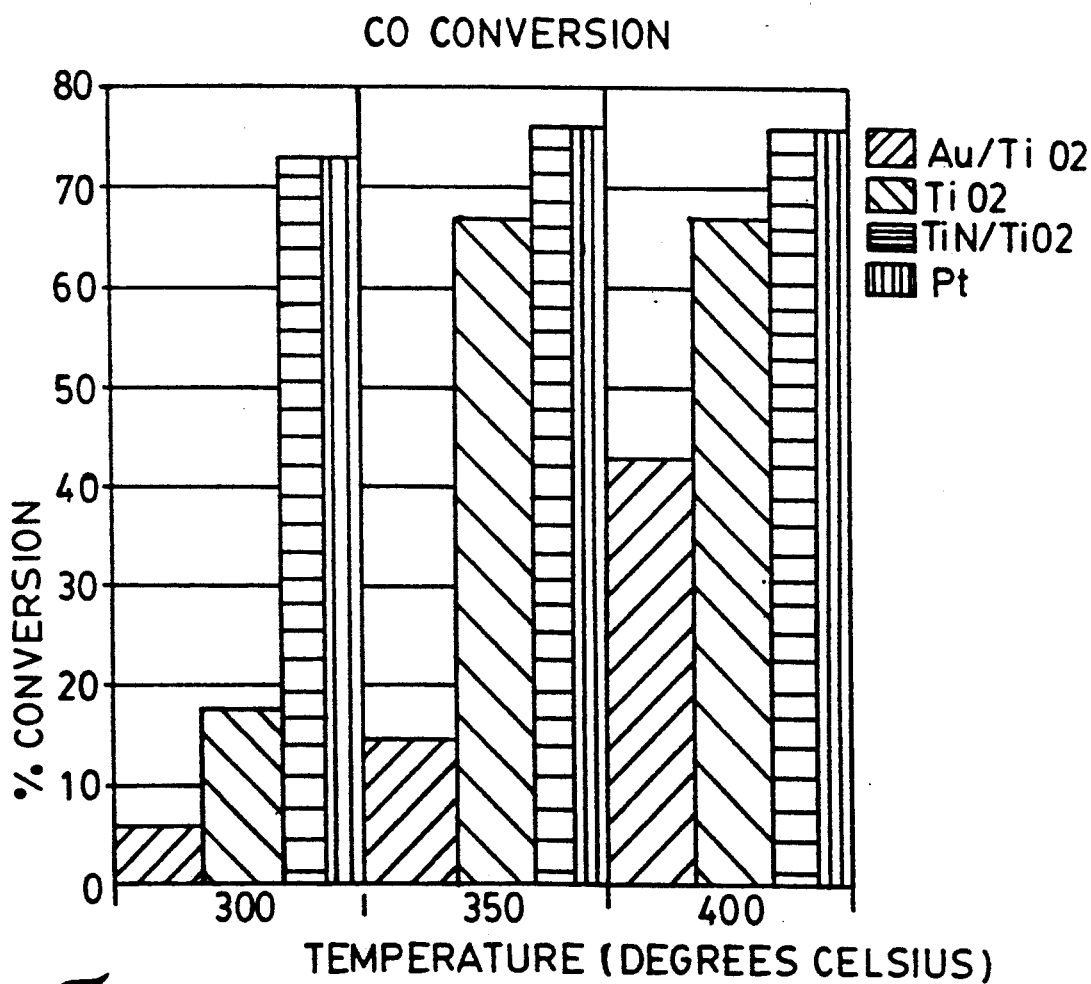
FIG. 3 is a bar graph illustrating percent CO conversion efficiency for three different activated titania catalyst systems compared to platinum alone.
Figure 4:
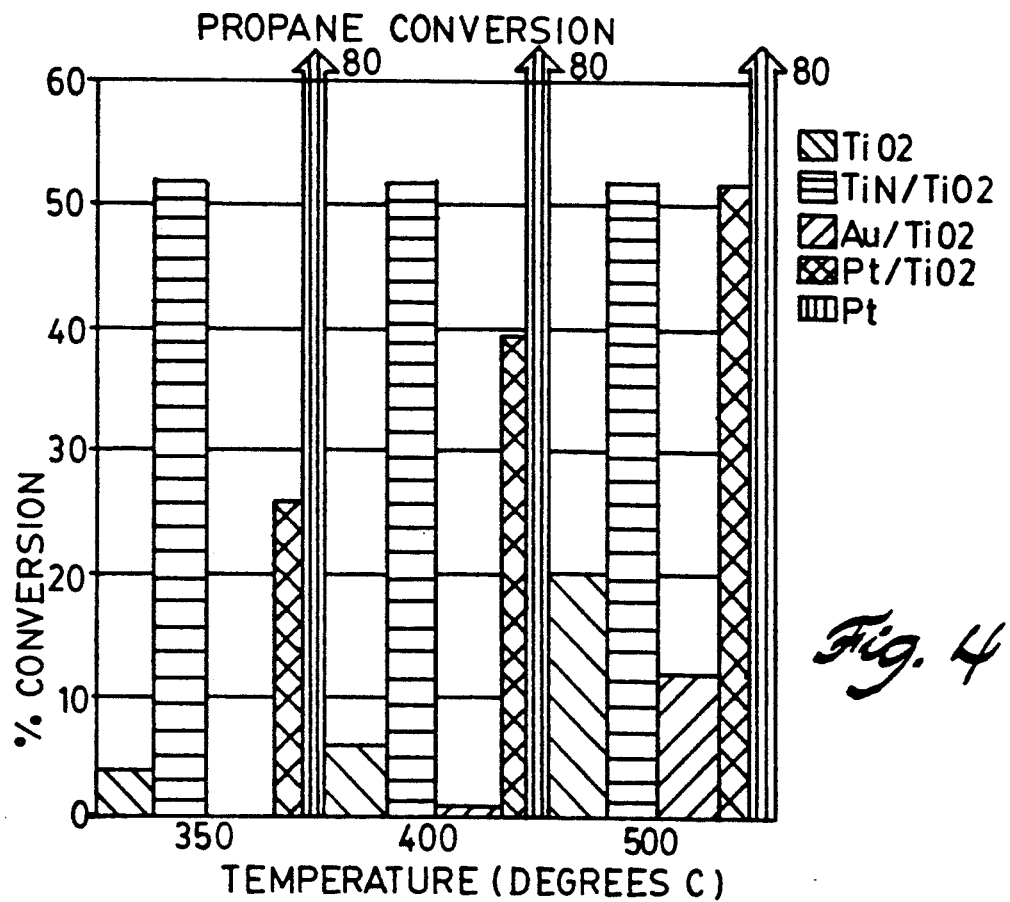
FIG. 4 is a bar graph illustrating percent propane conversion efficiency for four different activated titania catalyst systems compared to platinum alone.

The results obtained in the above examples are summarized and compared in FIGS. 3 and 4. These clearly demonstrate that conducting underlayers can have a great effect upon the catalytic properties of metal oxides such as $TiO_2$. TiN and Pt underlayers increase substantially the catalytic efficiency of $TiO_2$ for the oxidation of CO and propane. On the contrary, an underlayer of Au appreciably decreases this efficiency. The magnitude of the change depends strongly on the thickness of the $TiO_2$ layer with the optimum thickness being about 200 A. The results for Pt/$TiO_2$ samples (FIG. 4) are only for thick $TiO_2$ films of 1000 A. For these samples, the measured efficiency for the oxidation of propane was a factor of 1.6 to 3, lower than that of the pure Pt film, depending on the temperature. If the thickness dependence of the catalytic enhancement for $TiO_2$/Pt is similar to that of the $TiO_2$/TiN system, then the efficiency of the $TiO_2$/Pt structures with optimum $TiO_2$ thickness is equal to or higher than that of pure Pt.

The mechanism responsible for these changes in the catalytic activity of $TiO_2$ when a conducting material is in intimate contact with $TiO_2$ under the conditions described above is not presently known. It is speculated that it is related to the small size of the materials involved in the described structures. It is known that when the size of the materials becomes smaller than a certain value, the properties of the materials can change substantially. It is believed that the exchange of charge between the $TiO_2$ and the metallic underlayer changes the electronic/electrical properties of $TiO_2$. This becomes more pronounced as the size (e.g., thickness) of the $TiO_2$ material becomes less than 1000 A (0.000004 inches). Changes in the electron states inside and on the free surface of $TiO_2$, the work function, and other properties do have a pronounced effect on the interactions between the solid oxide and the gas molecules in the ambient gas phase which are reflected in the modifications of the catalytic activity of the oxide material. The direction (increase or decrease) and magnitude of this modification will depend not only on the particular metal oxide (e.g., $TiO_2$), but also on the conducting underlayer, and also on the specific gas molecule under consideration. Thus, if one desired to make $TiO_2$ more selective to CO in a gas mixture of propane and CO, gold would be selected as the underlayer to desensitize the outer surface to the less active propane and the temperature of the gas mixture would be lowered to further reduce the catalytic sensitivity of $TiO_2$ to the less active propane. .

Although the results shown above were for $TiO_2$, similar effects will be obtained with other catalytic metal oxides such as $SnO_2$, FeO, $SrTiO_2$, and CoO. Furthermore, conducting underlayers other than Au, TiN, and Pt discussed above will exhibit similar effects; examples of other conducting underlayers are Pd, Rh, Ni, and Co. It is also expected that the modifications in the catalytic properties of a material through the use of a conducting underlayer will occur for chemical reactions other than oxidation reactions. By selecting the conducting material and metal oxide, the exposed outer surface can be changed to an electron state that reduces a gas species, such as $NO_x$, rather than oxidize a reducing gas species, such as CO and HC.

The modified catalytic system, made as described above in the form of a planar structure consisting of films on a flat substrate, is convenient for use as a gas sensor. It can also be made in forms other than planar films which might be more appropriate for other applications. For example, it could be made in the form of a high surface area ceramic by dipping a high surface area inert ceramic (e.g., alumina) in appropriate solutions to successively deposit thin layers of the conducting material and the active metal oxide. This high surface area ceramic structure is more appropriate for efficient use as a catalytic converter. Another obvious embodiment of our invention is to make the material by coating small particles of the inert material (e.g., alumina) with a thin layer of the conducting material (e.g., Pt, Au) followed by a very thin layer of the active metal oxide (e.g., $TiO_2$), or even coating small particles of the conducting material with a very thin layer of the active metal oxide without the need for a nonconducting support.

Various modifications and variations will no doubt occur to those skilled in the art to which this invention pertains. For example, the metal oxide and conducting layers can be deposited by techniques other than sputtering: other vacuum deposition techniques (e.g., e- beam, MBE); laser ablation; and chemical vapor deposition (CVD). Also, a combination of two or more oxides or of two or more conducting underlayers may be used. These and all other variations which basically rely on the teachings through which this invention has advanced the art are properly considered within the scope of this invention.

TABLE I

| Sample | CO Conversion Efficiency (%) | | | Propane Conversion Efficiency (%) | | |
|---|---|---|---|---|---|---|
| | 300° C. | 350° C. | 400° C. | 300° C. | 400° C. | 500° C. |
| Quartz | 0 | 0 | 0 | 0 | 0 | 0 |
| Au/Quartz | 0 | 0 | 0 | 0 | 0 | 0 |
| TiO$_2$/Quartz | 18 | 67 | 68 | 4 | 6 | 20 |
| TiO$_2$/Au/Quartz | 6 | 15 | 43 | 0 | 1 | 12 |

TABLE II

| Sample | CO Conversion Efficiency (%) | | | Propane Conversion Efficiency (%) | | |
|---|---|---|---|---|---|---|
| | 300° C. | 350° C. | 400° C. | 350° C. | 400° C. | 500° C. |
| Quartz | 0 | 0 | 0 | 0 | 0 | 0 |
| TiN/Quartz | 0 | 0 | 0 | 0 | 0 | 0 |
| TiO$_2$/Quartz | 18 | 67 | 68 | 4 | 6 | 20 |
| TiO$_2$/TiN/Quartz | 73 | 76 | 76 | 52 | 52 | 52 |

TABLE III

| Sample | Propane Conversion Efficiency (%) | | |
|---|---|---|---|
| | 350° C. | 400° C. | 500° C. |
| Quartz | 0 | 0 | 0 |
| Pt/Quartz | 80 | 80 | 80 |
| TiO$_2$/Quartz | 4 | 6 | 20 |
| TiO$_2$/Pt/Quartz | 25 | 39 | 52 |

We claim:

1. A method of making a catalytic metal oxide selective to catalyzing the conversion of given gas species, comprising: intimately supporting a solid film of catalytic metal oxide on an electrically conducting material, said film having an exposed outer surface spaced no greater than 1000 angstroms from said conducting material and said conducting material being matched to the composition of said oxide to change the electron state of the exposed outer surface to promote a reaction between given gas species and said oxide, said metal oxide being selected from the group consisting of TiO$_2$, SnO$_2$, FeO, SrTiO$_3$, and CoO, and said conducting material being selected from the group consisting of Au, Pt, TiN, Pd, Rh, Ni, and Co.

2. The method as in claim 1, in which the thickness of said film is reduced to enhance the selectively of said oxide to catalyze oxidation of said given gas species.

3. A composite coating system for selective oxidation of HC and CO, comprising:
   (a) an electrically conducting and noncatalytically active film, said film having one or more constituents selected from the group consisting of gold, platinum, and titanium, nitride; and
   (b) a catalytically active ultra-thin outerlayer of TiO$_2$ on and in intimate contact with said conducting film.

4. The system as in claim 3, in which conducting film is supported on at least one of alumina and quartz.

5. The system as in claim 3, in which said conducting material is platinum or titanium nitride to increase the catalytic activity of said outer layer to oxidize HC and CO.

6. The system as in claim 3, in which said conducting material is gold to decrease the activity of said outerlayer to oxidize HC and CO.

7. The system as in claim 6, in which the thickness of said outerlayer is 50–1000 angstroms.

* * * * *